United States Patent
Nguyen et al.

(10) Patent No.: US 11,428,087 B2
(45) Date of Patent: Aug. 30, 2022

(54) ELECTRICALLY CONTROLLED PROPELLANT MATERIALS FOR SUBTERRANEAN ZONAL ISOLATION AND DIVERSION

(71) Applicant: Halliburton Energy Services, Inc., Houston, TX (US)

(72) Inventors: Philip D. Nguyen, Houston, TX (US); Norman R. Warpinski, Cypress, TX (US); Vladimir Nikolayevich Martysevich, Spring, TX (US); Ronald Glen Dusterhoft, Katy, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 169 days.

(21) Appl. No.: 16/337,318

(22) PCT Filed: Oct. 27, 2016

(86) PCT No.: PCT/US2016/059161
§ 371 (c)(1),
(2) Date: Mar. 27, 2019

(87) PCT Pub. No.: WO2018/080503
PCT Pub. Date: May 3, 2018

(65) Prior Publication Data
US 2020/0032633 A1 Jan. 30, 2020

(51) Int. Cl.
*E21B 43/247* (2006.01)
*C06B 25/34* (2006.01)
(Continued)

(52) U.S. Cl.
CPC ............ *E21B 43/247* (2013.01); *C06B 25/34* (2013.01); *C06B 31/30* (2013.01); *E21B 21/003* (2013.01); *E21B 33/138* (2013.01); *E21B 43/267* (2013.01)

(58) Field of Classification Search
CPC .... E21B 43/247; E21B 21/003; E21B 33/138; E21B 43/267; C06B 25/34; C06B 31/30
See application file for complete search history.

(56) References Cited

U.S. PATENT DOCUMENTS

| 5,265,678 A | 11/1993 | Grundmann |
| 5,346,015 A | 9/1994 | Grundmann |

(Continued)

FOREIGN PATENT DOCUMENTS

| CA | 3046918 A1 | 7/2018 |
| WO | 03/044317 A1 | 5/2003 |

(Continued)

OTHER PUBLICATIONS

International Search Report and Written Opinion issued in PCT Application No. PCT/US2016/059161 dated Jul. 20, 2017, 17 pages.

(Continued)

Primary Examiner — Crystal J. Lee
(74) Attorney, Agent, or Firm — Kilpatrick Townsend & Stockton LLP

(57) ABSTRACT

Methods of diverting fluid flow, controlling fluid loss, and/or providing zonal isolation in subterranean formations are provided. In some embodiments, the methods comprise: providing a particulate material that comprises an electrically controlled propellant; placing the particulate material in at least a first portion of the subterranean formation; introducing a treatment fluid into the subterranean formation; and allowing the particulate material to at least partially (Continued)

divert the flow of the treatment fluid away from the first portion of the formation.

18 Claims, 4 Drawing Sheets

(51) Int. Cl.
*C06B 31/30* (2006.01)
*E21B 21/00* (2006.01)
*E21B 33/138* (2006.01)
*E21B 43/267* (2006.01)

(56) References Cited

U.S. PATENT DOCUMENTS

| | | | |
|---|---|---|---|
| 6,098,516 A * | 8/2000 | Gazonas | E21B 43/26 86/20.15 |
| 6,672,405 B2 | 1/2004 | Tolman et al. | |
| 7,073,581 B2 | 7/2006 | Nguyen et al. | |
| 8,317,952 B2 | 11/2012 | Katzakian et al. | |
| 8,607,704 B2 | 12/2013 | Stark et al. | |
| 8,617,327 B1 | 12/2013 | Katzakian et al. | |
| 8,657,003 B2 | 2/2014 | Welton et al. | |
| 8,697,612 B2 | 4/2014 | Todd et al. | |
| 8,888,935 B2 | 11/2014 | Grix et al. | |
| 8,931,553 B2 | 1/2015 | Cannan et al. | |
| 8,936,086 B2 | 1/2015 | Liang et al. | |
| 9,023,770 B2 | 5/2015 | Todd et al. | |
| 9,027,641 B2 | 5/2015 | Alekseenko et al. | |
| 9,182,207 B2 | 11/2015 | McPherson et al. | |
| 9,243,491 B2 | 1/2016 | McDaniel et al. | |
| 2004/0106525 A1 | 6/2004 | Willberg et al. | |
| 2005/0130845 A1 | 6/2005 | Freeman et al. | |
| 2006/0016688 A1 | 1/2006 | Carrier et al. | |
| 2008/0289823 A1* | 11/2008 | Willberg | C09K 8/508 166/280.2 |
| 2011/0067789 A1* | 3/2011 | Grix | C06B 31/00 149/19.1 |
| 2012/0103479 A1* | 5/2012 | Katzakian | C06B 45/10 149/19.1 |
| 2014/0109788 A1* | 4/2014 | McPherson | C06B 23/007 102/202.9 |
| 2014/0116703 A1 | 5/2014 | Reddy et al. | |
| 2014/0190686 A1* | 7/2014 | Cannan | C23C 14/06 166/250.01 |
| 2014/0338905 A1 | 11/2014 | Ersoz et al. | |
| 2014/0345863 A1* | 11/2014 | Ladva | E21B 43/267 166/280.1 |
| 2014/0372089 A1 | 12/2014 | Weng et al. | |
| 2015/0107830 A1 | 4/2015 | Ersoz et al. | |
| 2015/0308221 A1 | 10/2015 | Skov et al. | |
| 2015/0354337 A1 | 12/2015 | Ersoz et al. | |

FOREIGN PATENT DOCUMENTS

| | | |
|---|---|---|
| WO | 2014/022184 A1 | 2/2014 |
| WO | 2015016878 A1 | 2/2015 |
| WO | 2015/126365 A1 | 8/2015 |

OTHER PUBLICATIONS

Office Action issued in related Canadian Patent Application No. 3037299 dated Oct. 5, 2020, 4 pages.
Office Action issued in related Canadian Patent Application No. 3037299 dated Apr. 21, 2020, 5 pages.

* cited by examiner

ELECTRICALLY CONTROLLED PROPELLANT MATERIALS FOR SUBTERRANEAN ZONAL ISOLATION AND DIVERSION

CROSS-REFERENCE TO RELATED APPLICATION

The present application is a U.S. National Stage Application of International Application No. PCT/US2016/059161 filed Oct. 27, 2016, which is incorporated herein by reference in its entirety for all purposes.

BACKGROUND

The present disclosure relates to systems and methods for performing subterranean operations.

Diverting agents may be used in a variety of subterranean treatments. Such treatments include, but are not limited to, drilling, stimulation treatments (e.g., fracturing treatments, matrix acidizing treatments), and cementing operations. To insure that the producing zone is contacted by the treating fluid uniformly, a particulate solid diverting agent may be placed in the zone to direct the placement of a desired treatment fluid. One technique has been to pack the diverting agent in perforation tunnels extending from the well bore into the subterranean zone. The diverting agent in the perforation tunnels causes the treating fluid introduced therein to be uniformly distributed between all of the perforations whereby the subterranean zone is uniformly treated. The term "zone," as used herein, simply refers to a portion of the formation and does not imply a particular geological strata or composition. Traditional examples of particulate diverting agents are inorganic materials such as rock salts and polymeric materials such as starch, polyesters, and the like.

Drilling and servicing fluids used in subterranean operations also deposit a layer of particles known as "filter cake" on the walls of the well bores within the producing formations. Drilling and servicing fluids usually comprise fluid loss control materials, a polymer solid suspending agent, and an acid soluble particulate solid bridging agent that aids in forming the filter cake. The filter cake prevents the drilling and servicing fluids from being lost into the formations and prevents solids from entering the porosities of the producing formations. The filter cake reduces operational costs by precluding the loss of fluids into the formation and preventing solids from entering the porosities of the formation. Following completion and prior to initiating production, the filter cake must be removed.

Self-degradable diverting and/or bridging agents may be removed after use by allowing the particulate material to degrade over time. However, these degradation processes may be difficult to control at downhole conditions, and may occur too quickly (i.e., before removal is desired) or, in other cases, too slowly, which may cause a delay in production of hydrocarbons from the formation. Other bridging agents, filter cakes, and diverting agents are sometimes removed by contacting them with a strongly acidic solution for a period of time sufficient to dissolve the solid particles and decompose any polymer. Despite current anti-corrosion steps, acidic solutions often corrode metallic surfaces and completion equipment such as sand control screens causing early failure of such equipment. Acidic solutions also may be incompatible with the producing formation and cause damage thereto. Other operations used for removing such particulate agents often entail considerable time and expense and added complications.

BRIEF DESCRIPTION OF THE DRAWINGS

These drawings illustrate certain aspects of some of the embodiments of the present disclosure, and should not be used to limit or define the claims.

Figure 1:
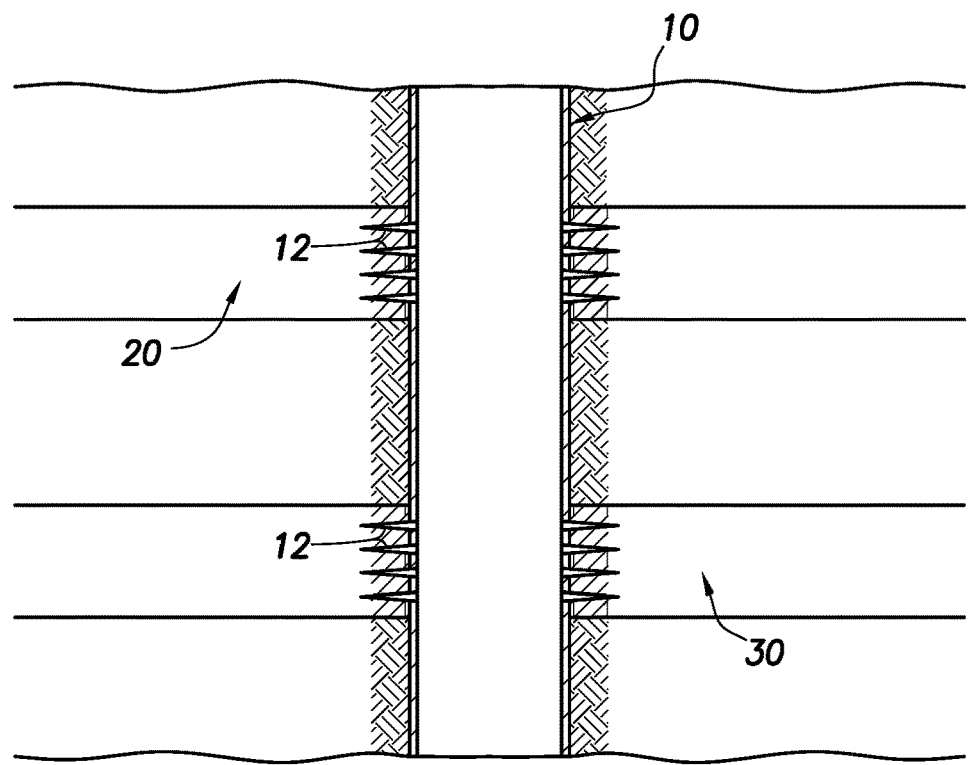
FIGS. 1-6 are diagrams illustrating a well bore in a subterranean formation according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for performing subterranean operations. More particularly, the present disclosure relates to systems and methods of diverting fluid flow, controlling fluid loss, and/or providing zonal isolation in subterranean formations.

The present disclosure provides methods and systems in which a solid electrically controlled propellant is introduced into at least a portion of a subterranean formation as a part of a temporary diverting agent, bridging agent, proppant material, or plugging material. The electrically controlled propellants used in the present disclosure are solid substances that can be ignited by passing an electrical current through the propellant, which produces energy, gas, or other by-products. The methods of the present disclosure generally comprise introducing the electrically controlled propellant (either alone or mixed with other materials) into at least a portion of a subterranean formation. In certain embodiments, the electrically controlled propellants may be provided in a form that is suitable to at least partially obstruct (e.g., bridge) pore throats of a subterranean formation and/or form a filter cake therein, which may prevent the loss of fluid into the formation matrix. In other embodiments, the electrically controlled propellants may be provided as a component of a composition that can be placed in an open space in a subterranean formation to at least partially obstruct (e.g., form a plug in) the flow of fluid into that area of the formation. In certain embodiments, the electrically controlled propellant may be deposited in one or more propped fractures in a subterranean formation to facilitate the formation of conductive channels therein. In any of the above embodiments, the electrically controlled propellants and/or the bridging or plugging materials in which they are provided may be at least partially removed from the formation by applying an electrical current to the propellant, thereby causing the propellant to be combusted.

Among the many potential advantages to the methods and compositions of the present disclosure, only some of which are alluded to herein, the methods, compositions, and systems of the present disclosure may provide a temporary diverting agent, bridging agent, proppant material, or plugging material that can be removed with greater control and/or removed more completely from a subterranean formation as compared to certain conventional materials used in the art for those purposes. In some embodiments, the compositions of the present disclosure comprising an electrically controlled propellant may be substantially removed from a subterranean formation more quickly and/or more completely in low temperature and pressure environments. This may, among other benefits, may reduce shut-in times needed to restore permeability of a formation, allow production from those formations to begin more quickly, and/or alleviate the need for separate remediation treatments to restore permeability and/or production. In some embodiments, the compositions of the present disclosure comprising an electrically controlled propellant may be more stable at high temperatures and pressures, and thus may have a lower risk of being inadvertently or prematurely removed from a subterranean formation at those conditions before a treatment operation in which they are used is complete. In some embodiments, the compositions of the present disclosure may provide a temporary material that can be removed in a manner that produces only non-toxic by-products (e.g., carbon dioxide, nitrogen, and water).

The electrically controlled propellants of the present disclosure may comprise any substance known in the art that can be ignited by passing an electrical current through the propellant. The electrically controlled propellant may be provided in any form, including solids (e.g., powders, pellets, etc.), liquids, semi-solids (e.g., gels), and the like. In certain embodiments, the electrically controlled propellant may comprise a binder (e.g., polyvinyl alcohol, polyvinylamine nitrate, polyethanolaminobutyne nitrate, polyethyleneimine nitrate, copolymers thereof, and mixtures thereof), an oxidizer (e.g., ammonium nitrate, hydroxylamine nitrate, and mixtures thereof), and a crosslinking agent (e.g., boric acid). Such propellant compositions may further comprise additional optional additives, including but not limited to stability enhancing or combustion modifying agents (e.g., 5-aminotetrazole or a metal complex thereof), dipyridyl complexing agents, polyethylene glycol polymers, and the like. In certain embodiments, the electrically controlled propellant may comprise a polyalkylammonium binder, an oxidizer, and an eutectic material that maintains the oxidizer in a liquid form at the process temperature (e.g., energetic materials such as ethanolamine nitrate (ETAN), ethylene diamine dinitrate (EDDN), or other alkylamines or alkoxylamine nitrates, or mixtures thereof). Such propellants may further comprise a mobile phase comprising at least one ionic liquid (e.g., an organic liquid such as N,n-butylpyridinium nitrate). Certain of the aforementioned propellants may be commercially available from Digital Solid State Propulsion, Inc. of Reno, Nev.

In certain embodiments, the electrically controlled propellant may be mixed with and/or embedded in other materials to form a bridging composition, plugging composition, and/or proppant composition that can be placed in a subterranean formation. In some embodiments, these materials may include materials that are used as conventional plugging materials, bridging agents, proppants, and/or diverting agents. Examples of other such materials that may be used in combination with the electrically controlled propellants include, but are not limited to acid soluble materials, degradable materials (e.g., polylactic acid), cement, fiberglass, ceramic materials, carbon fibers, polymeric materials, sand, clay, any combinations thereof, or any other suitable material. In certain embodiments, the electrically controlled propellants may be mixed with particles of electrically conductive materials, among other reasons, to help conduct electrical current throughout the composition to facilitate its ignition and removal when the current is applied, even to far-field regions of a subterranean formation. In certain embodiments, the electrically conductive materials may comprise micro- and/or nano-sized particles. Examples of electrically conductive materials that may be suitable in certain embodiments of the present disclosure include but are not limited to metal powders, metal shavings, steel shot, graphite, calcined coke, metal coated particles, particles coated with electrically conductive polymer, and any combinations thereof. Examples of conductive metals that may be suitable for use in certain embodiments of the present disclosure include, but are not limited to, graphite, silver, gold, calcium lithium, platinum, titanium, nickel, copper, iron, silver, zinc, brass, tin, aluminum, steel, lead, magnesium, and any alloy or combination thereof. In some embodiments, the electrically conductive material may comprise an electrically conductive polymer material, such as at least one of a polypyrrole, polyfuran, polythiophene, polyaniline, as well as any copolymers, combinations, and/or derivatives thereof.

In certain embodiments, the electrically controlled propellant (and/or other particulate material with which it is mixed) may be sized to bridge the pore throats or other spaces a particular region of a subterranean formation, among other reasons, to reduce or prevent fluid loss into the formation matrix and/or to divert the flow of fluid to other (e.g., less permeable) regions of the formation. In certain of these embodiments, the electrically controlled propellant may have particle sizes in a particular range or in several discrete ranges (e.g., as a multimodal material). In certain embodiments, the electrically controlled propellant may have a particle sizes in the range of from about 0.1 micron to about 1.0 millimeter. In certain embodiments, the electrically controlled propellant may have a particle sizes in the range of from about 1 micron to about 300 microns, or from about 1 micron to about 200 microns, or from about 1 micron to about 30 microns. The electrically controlled propellant may have a broader particle size distribution, or a narrower particle size distribution. The selection of a suitable particle size distribution for the electrically controlled propellant may depend on factors such as, inter alia, permeability of the formation, the type of formation, the extent of the angle between the natural fractures and man-made fractures therein, and the like. One of ordinary skill in the art, with the benefit of this disclosure, will be able to identify a suitable particle size distribution for the electrically controlled propellant for a particular application. In certain of these embodiments, the electrically controlled propellant (and/or other particulate material with which it is mixed) may have any shape, including, but not limited to, particles having the physical shape of platelets, shavings, flakes, ribbons, rods, strips, spheroids, toroids, pellets, tablets, or any other physical shape. One of ordinary skill in the art, with the benefit of this disclosure, will recognize the suitable sizes and shapes of the electrically controlled propellant for a given application of the present disclosure.

In order to remove the bridging and/or plugging materials of the present disclosure in the subterranean formation, an electrical current may be applied to a wire, cable, or other electrically conductive structure in contact with the material to ignite the electrically controlled propellant therein, causing at least a portion of the bridging and/or diverting material to burn, melt, break apart, or otherwise be removed. That electrical current may be transmitted or otherwise provided to the bridging and/or plugging material using any means known in the art. In some embodiments, electrical current is provided from a direct current (DC) source, although electrical power from alternating current (AC) sources can be used as well. In some embodiments, the source of electrical current may be provided at the surface, and the current may be transferred via a conductive wire, cable, and/or tubing into the subterranean formation to the bridging and/or plugging material comprising the electrically controlled propellant. In certain embodiments, the electrical current may be applied to a liner or casing in the subterranean formation that is made of electrically conductive material and is in contact with the bridging and/or plugging materials downhole, thereby transferring the electrical current to those materials. In certain embodiments, the electrical current may pass through any number of secondary relays, switches, conduits (e.g., wires or cables), equipment made of conductive material (e.g., metal casings, liners, etc.) or other electrically conductive structures. In other embodiments, the electrical current also may be provided by some other downhole energy source (such as downhole charges, hydraulic power generators, batteries, or the like), and then applied to the bridging and/or plugging material comprising the electrically controlled propellant. In certain embodiments, the amount of electrical current applied to ignite the electrically controlled propellant may range from about 10 milliamps to about 100 milliamps. In certain embodiments, the electrical current applied to ignite the electrically controlled propellant may have a corresponding voltage of from about 200V to about 600V.

The electrically controlled propellant may be ignited at any time, and the application of electrical current to the propellant may be triggered in any known way. In some embodiments, the current may be applied in response to manual input by an operator, either at the surface of the well site where the bridging and/or plugging material is used or from a remote location. In other embodiments, the current may be applied automatically in response to the detection of certain conditions in the formation using one or more downhole sensors. Examples of downhole sensors that may be used in this way include, but are not limited to, pressure sensors, temperature sensors, water sensors, motion sensors, chemical sensors, and the like.

As noted above, in certain embodiments, the electrically controlled propellant in the bridging and/or plugging material may be re-ignited after it has been at least partially ignited in an earlier use. For example, in some embodiments, a portion of the electrically controlled propellant may be ignited to partially remove a bridging material or diverting material of the present disclosure in the formation, and then may be re-ignited to remove more of that material or plug at a later time. This re-ignition may be accomplished either manually or automatically using any known mechanisms for applying electrical current, including but not limited to the mechanisms described above. Where a propellant is re-ignited automatically in response to detection of certain conditions by a sensor, those conditions may be the same conditions as or different conditions from the conditions that initially triggered the ignition of the propellant.

The present disclosure in some embodiments provides methods and systems that may be used in carrying out a variety of subterranean operations, including but not limited to, drilling operations, workover operations, cementing operations, completions operations, stimulation operations (e.g., hydraulic fracturing treatments or acidizing treatments), well bore clean-up operations, and the like. The methods and systems of the present disclosure also may be used during periods when hydrocarbons or other fluids are being produced from a subterranean formation and/or well bore. The well bores in which the methods and systems of the present disclosure may be used may be cased holes or open holes, as well as partially cased or partially open holes. The well bores also may be vertical well bores or may comprise portions that are deviated or horizontal to any degree.

For example, the electrically controlled propellants of the present disclosure may be provided as a component of a drilling fluid that is used in the course of a drilling operation, among other reasons, to cool and/or lubricate a drill bit and/or to carry cuttings out of the well bore. When provided in particles of an appropriate size, the electrically controlled propellants in the drilling fluid may be deposited on the inner wall of a well bore as the well bore is drilled, forming a portion of a filter cake thereon. This may, among other benefits, reduce or prevent the loss of drilling fluid into the well bore. Similarly, the electrically controlled propellant may be provided as a component of a fracturing fluid and form such a filter cake in a formation during a hydraulic fracturing treatment. The deposition of the electrically controlled propellant in these treatments may, among other benefits, reduce or prevent the loss of fluid pressure during the fracturing treatment. After the well bore is drilled or the fracturing treatment is completed, the filter cake comprising electrically controlled propellant may be removed by applying an electrical current to the walls of the well bore and/or to the fracture faces to ignite the electrically controlled propellant.

In matrix treatments such as acidizing treatments, bridging materials comprising the electrically controlled propellant may act as a diverting agent to facilitate the creation of more complex fractures and/or wormholes in the formation matrix, which may stimulate certain regions of the formation (e.g., near-wellbore regions as well as far-field regions) more effectively. In these treatments, a treatment or series of treatment fluids may be injected into the reservoir at matrix injection rates to maintain pressure below the fracture gradient of the formation. In these treatments, stages of electrically controlled propellant materials (alone or mixed with other particulate materials) can be introduced into the formation to plug off or reduce the rate of fluid entering more permeable perforations or natural fractures to distribute the flow of the treatment fluid more uniformly over a long interval. In certain embodiments, the electrically controlled propellant may divert fracturing fluid flowing into through a fracture to alter the flowpath of that fracturing fluid, which may facilitate branching and/or creation of more complex fracture patterns in the formation. Upon the completion of the treatment, the material comprising the electrically controlled propellant can be removed by the application of an electrical current to the material, thereby causing the propellant to ignite.

Figure 2:
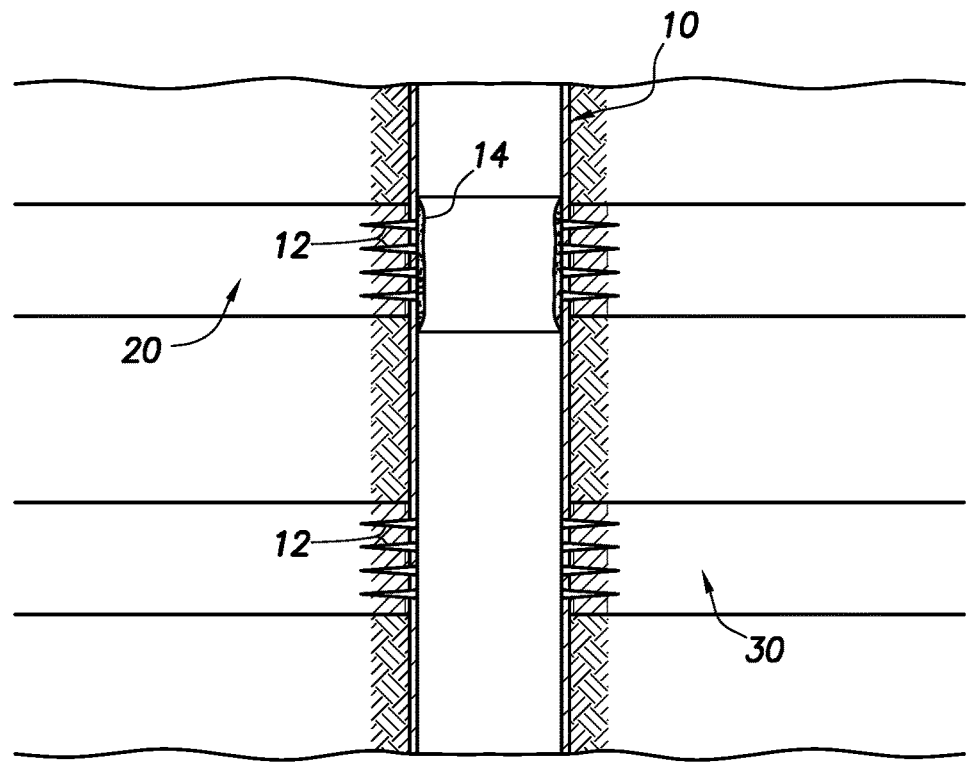
Figure 3:
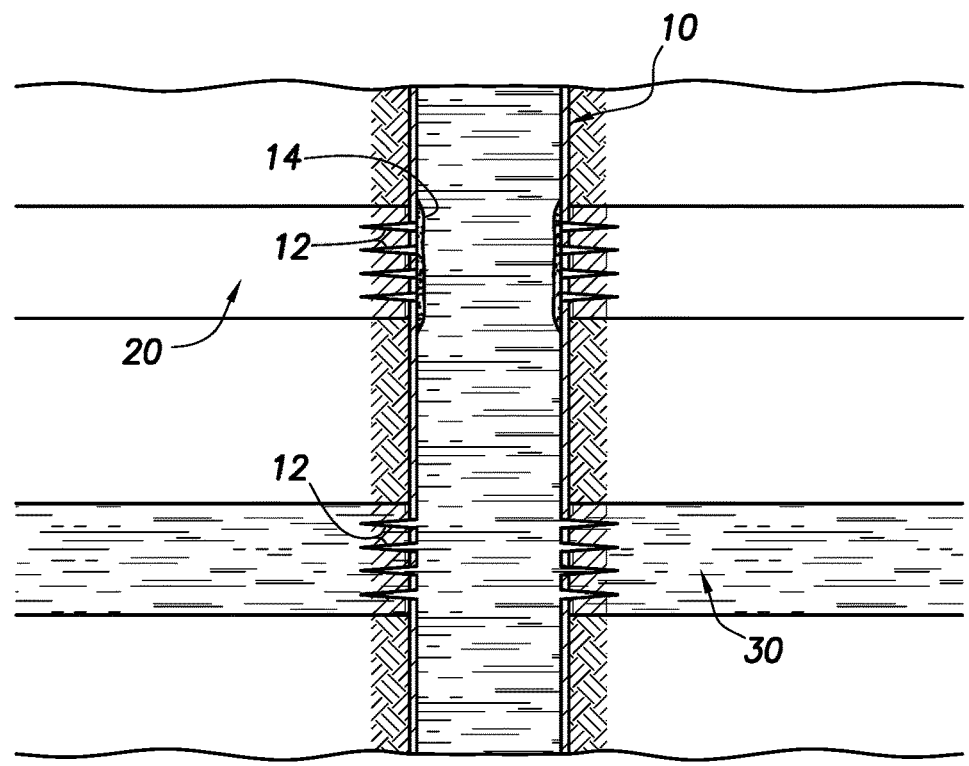

In certain embodiments, stages of a bridging material comprising electrically controlled propellant may be introduced into a subterranean formation in the course of fracturing and/or re-fracturing treatments in certain regions or zones in the formation, among other reasons, to selectively treat certain regions and/or facilitate more uniform stimulation of different regions of the formation having different permeabilities. An example of such a treatment is shown in FIGS. 1 through 6. Referring now to FIG. 1, a side view of subterranean formation penetrated by a well bore with a casing string 10 placed in the well bore is shown. The figure shows the well bore oriented vertically, although as a person of skill in the art with the benefit of this disclosure will appreciate, the well bore could also include one or more horizontal and/or deviated sections. The well bore penetrates two zones 20 and 30 in the subterranean formation, wherein the fluid flow resistance of zone 30 is higher than the fluid flow resistance of zone 20. For example, one or more fracturing treatments may have been previously performed in zone 20, which may have increased its fluid permeability and/or depleted the amount of oil, gas, or other fluids to produce therefrom. Turning to FIG. 2, a diverting material 14 comprising an electrically controlled propellant of the present disclosure is placed to obstruct zone 20 and divert fluid flowing into the well bore to other portions of the subterranean formation. Turning to FIG. 3, a fracturing fluid 16 (which may comprise a series of fluids, including a pad fluid, proppant-carrying fracturing fluid, etc.) is introduced into zone 30 to create or enhance one or more fractures therein, despite the higher fluid flow resistance of zone 30, because the diverting material 14 diverts the fluid away from zone 20.

Figure 4:
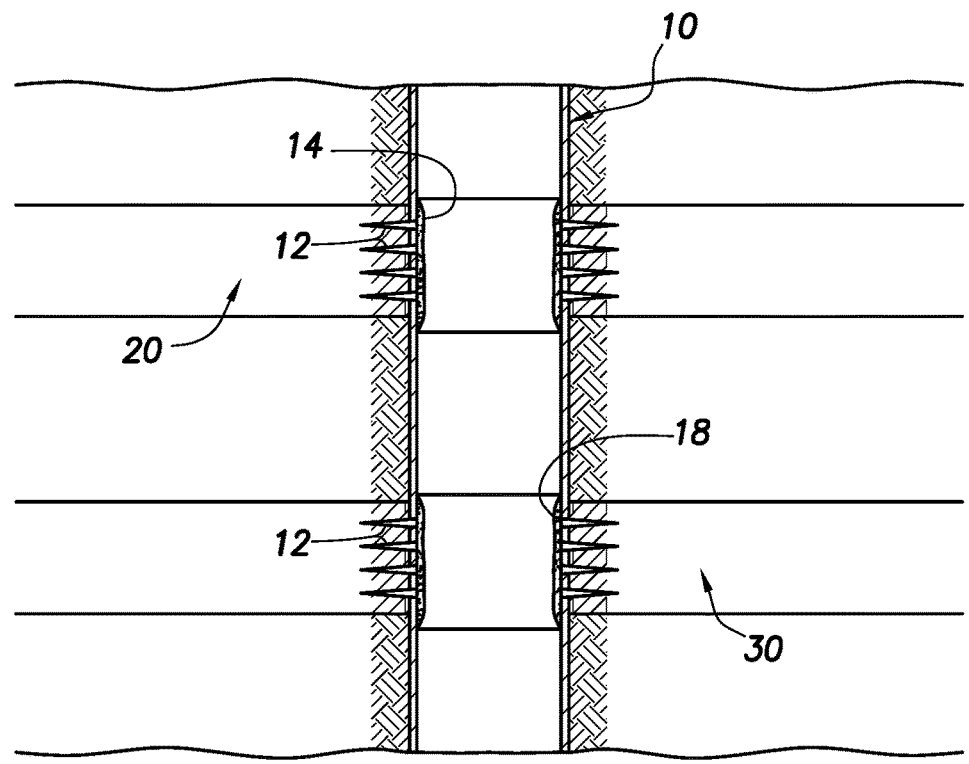
Figure 5:
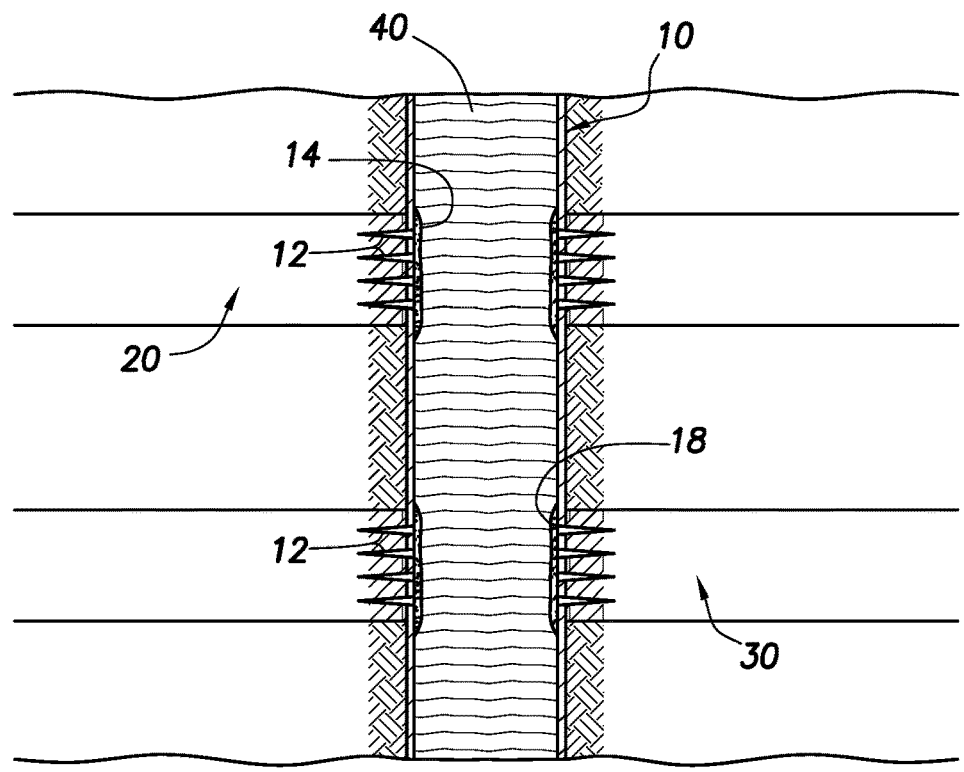
Figure 6:
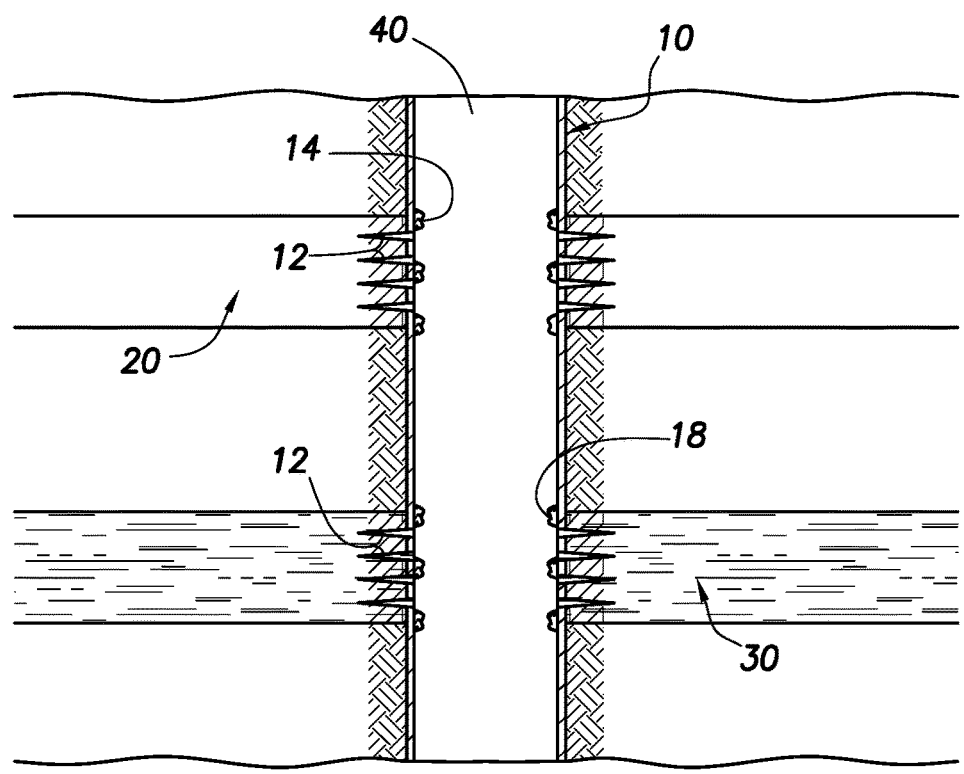

Turning to FIG. 4, once zone 30 has been sufficiently treated, a diverting material 18 comprising an electrically controlled propellant of the present disclosure may be placed to obstruct now treated zone 30 to facilitate the treatment of other zones (not shown) penetrated by the well bore. Turning to FIG. 5, treatment fluid 40 (which may comprise a series of fluids, including a pad fluid, proppant-carrying fracturing fluid, etc.) may be introduced into the well bore, which is then diverted to other portions of the subterranean formation. This process may be repeated to treat a series of different zones in the formation. When the desired number of zones have been treated, an electrical current can be applied to the well bore 10 (e.g., via casing 10 or a conductive wire or cable (not shown) run down the well bore, either before or after the diverting materials 14 and 18 were placed) to ignite the electrically controlled propellant in the diverting materials 14 and 18. As shown in FIG. 6, this may cause the diverting materials 14 and 18 to be at least removed, so that zones 20 and 30 can be placed into production.

In treating different perforated zones in a formation (e.g., zones 20 and 30 shown in FIGS. 1-6), the different zones of a formation may be treated in any order that is suitable. In some embodiments, a bridging material comprising electrically controlled propellant can be used to isolate one or more existing fracture stages in a wellbore to enable perforating and additional fracture stages to be conducted progressively moving from the bottom of a vertical or deviated wellbore to the top, or from the toe of a horizontal well bore to the heel. In these embodiments, fracturing fluids (which may comprise a series of fluids, including a pad fluid, proppant-carrying fracturing fluid, etc.) may be introduced into a perforated zone in the well bore to create or enhance one or more fractures therein, followed by a diverting material comprising an electrically controlled propellant of the present disclosure to obstruct that fractured zone at or near the perforations. The diverting material may be placed so as to plug all fractures and perforations in the well bore, to effectively create a plug in the well bore. Then, additional perforations can then be inserted above the plug, e.g., using coiled tubing with tubing conveyed perforating, coiled tubing with hydraulic jetting to create new perforations or wireline conveyed perforating, depending on local well bore conditions. Then, additional fracturing treatments may be performed on the newly-perforated zones. Once the desired zones have been fractured, the diverting material comprising the electrically controlled propellant can be removed by the application of an electrical current to the material, thereby causing the propellant to ignite, and allowing the well bore to be placed into production.

In other embodiments, a plugging material comprising electrically controlled propellant may be introduced into other regions of a formation (e.g., other than perforations in a well bore casing) to form a plug therein. In certain embodiments, the electrically controlled propellant may be mixed with other materials suitable for forming plugs in a formation, including but not limited to cement, sand, or the like. Such plugs comprising electrically controlled propellant may isolate a particular portion of a well bore or subterranean formation, among other reasons, in order to allow for selective treatment of other areas, or to prevent the flow of fluids from one area of a formation to another. These plugs may be useful in many different types of subterranean operations, including those listed above.

In still other embodiments, a particulate material comprising electrically controlled propellant may be introduced in "pulses" or alternating intervals with an electrically conductive proppant particulates (either alone or in combination with other proppant materials) into a fracture in a subterranean formation. These materials may be carried in one or more fluids that are introduced into a well bore penetrating the subterranean formation, which may be introduced at or above a pressure sufficient to create or enhance the fracture. In certain embodiments, the fracture in the formation may have been created or enhanced by the introduction of one or more fluids (e.g., a pad fluid) at or above a pressure sufficient to create or enhance the fracture before the proppant particulates and propellant are introduced. Optionally, one or more displacement fluids may be introduced into the formation after the alternating stages of fluids comprising the electrically controlled propellant material and the proppant particulates, among other reasons, to displace any loose or excess particulates from the well bore and/or to secure the proppant in the propped fracture. This pulsing of proppant material and propellant may facilitate the creation of "pillars" of proppant and/or open channels through a propped fracture. In particular, once the electrically controlled propellant and proppant particulates are placed in the fracture in this manner, an electrical current may be applied to the electrically controlled propellant to ignite it, leaving behind open spaces or channels in the areas where the propellant was previously placed. The electrically conductive proppant material may, among other purposes, facilitate the transmission of the electrical current throughout the fracture to more uniformly ignite the electrically controlled propellant therein.

In any of the aforementioned embodiments, the electrically controlled propellant may be ignited after the operation is completed to facilitate the removal of the filter cake, diverting material, and/or plugging material in order to restore the permeability and/or flow of fluid through that area of the formation after use.

Figure 7:
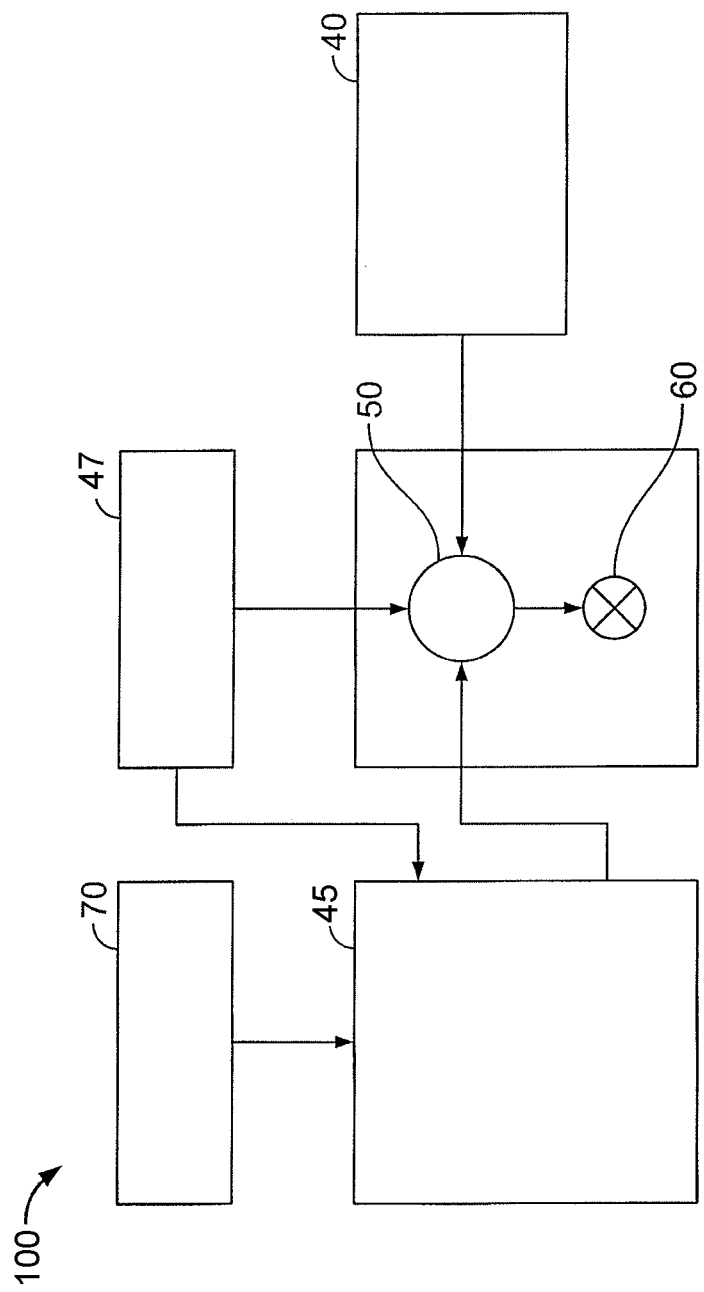
FIG. 7 is a diagram illustrating an example of a fracturing system that may be used in accordance with certain embodiments of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 7, the disclosed methods and compositions may directly or indirectly affect one or more components or pieces of equipment associated with an exemplary fracturing system 100, according to one or more embodiments. In certain instances, the system 100 includes a fracturing fluid producing apparatus 45, a fluid source 47, a proppant source 40, and a pump and blender system 50 and resides at the surface at a well site where a well 60 is located. In certain instances, the fracturing fluid producing apparatus 45 combines a gel pre-cursor with fluid (e.g., liquid or substantially liquid) from fluid source 47, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 45 can be omitted and the fracturing fluid sourced directly from the fluid source 47. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In some embodiments, the particulate material that comprises an electrically controlled propellant may be provided in additive source 70 and mixed with a fluid in the pump and blender system to carry the particulate material into the well bore.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 45, fluid source 47, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

While not specifically illustrated herein, the disclosed methods and compositions may also directly or indirectly affect any transport or delivery equipment used to convey the compositions to the fracturing system 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: providing a particulate material that comprises an electrically controlled propellant; placing the particulate material in at least a first portion of the subterranean formation; introducing a treatment fluid into the subterranean formation; and allowing the particulate material to at least partially divert the flow of the treatment fluid away from the first portion of the formation.

Another embodiment of the present disclosure is a system comprising: providing a treatment fluid comprising a base fluid and a particulate bridging material that comprises an electrically controlled propellant; introducing the treatment fluid into a well bore penetrating at least a portion of a subterranean formation; and forming a filter cake in the well bore that comprises the electrically controlled propellant.

Another embodiment of the present disclosure is a method comprising: introducing into a well bore penetrating a portion of a subterranean formation alternating stages of a first fluid comprising a first base fluid and a plurality of electrically conductive proppant particulates, and a second fluid comprising a second base fluid and a plurality of particulates that comprise an electrically controlled propellant; and depositing the plurality of electrically conductive proppant particulates and the plurality of particulates that comprise an electrically controlled propellant material in at least one fracture in the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a particulate material that comprises an electrically controlled propellant;
   placing the particulate material in at least a first portion of a subterranean formation;
   introducing a treatment fluid into the subterranean formation;
   allowing the particulate material to at least partially divert a flow of the treatment fluid away from the first portion of the subterranean formation wherein:
      the first portion of the subterranean formation comprises one or more perforations in a casing disposed in a first interval of a well bore that penetrates at least the first portion of the subterranean formation; and
      the particulate material at least partially obstructs the perforations in the first interval of the well bore and diverts the flow of the treatment fluid to a second interval of the well bore, and
   applying an electrical current to at least a portion of the electrically controlled propellant to ignite the portion of the electrically controlled propellant in the first portion of the subterranean formation.

2. The method of claim 1, wherein the electrical current is applied in an amount of from about 10 milliamps to about 100 milliamps.

3. The method of claim 1, wherein the electrical current is applied to at least a portion of the casing in a well bore penetrating at least the first portion of the subterranean formation.

4. The method of claim 1, wherein the particulate material further comprises at least one material selected from the group consisting of: an acid soluble material, a degradable material, cement, fiberglass, a ceramic material, carbon fibers, a polymeric material, sand, clay, and any combination thereof.

5. The method of claim 1, wherein introducing the treatment fluid into the subterranean formation comprises introducing the treatment fluid into the subterranean formation at or above a pressure sufficient to create or enhance at least one fracture in the subterranean formation.

6. The method of claim 1, wherein the treatment fluid comprises an acid.

7. The method of claim 1, wherein the electrically controlled propellant comprises:
   a binder selected from the group consisting of: polyvinyl alcohol, polyvinylamine nitrate, polyethanolaminobutyne nitrate, polyethyleneimine nitrate, any copolymer thereof, and any mixture thereof;
   an oxidizer selected from the group consisting of: ammonium nitrate, hydroxylamine nitrate, and any mixture thereof; and
   a crosslinking agent.

8. The method of claim 1, wherein the electrically controlled propellant comprises:
   a binder consisting of polyvinyl alcohol;
   an oxidizer consisting of ammonium nitrate, and
   a crosslinking agent.

9. The method of claim 1, wherein the electrically controlled propellant comprises:
   a binder consisting of polyvinylamine nitrate;
   an oxidizer consisting of ammonium nitrate; and
   a crosslinking agent.

10. The method of claim 1, wherein the electrically controlled propellant comprises:
   a binder consisting of polyethanolaminobutyne nitrate;
   an oxidizer consisting of ammonium nitrate; and
   a crosslinking agent.

11. The method of claim 1, wherein the electrically controlled propellant comprises:
   a binder consisting of polyethyleneimine nitrate;
   an oxidizer consisting of ammonium nitrate; and
   a crosslinking agent.

12. The method of claim 1, wherein the electrical current is applied with a corresponding voltage of from about 200V to about 600V.

13. The method of claim 1, wherein the electrical current is provided from a direct current source.

14. The method of claim 1, wherein the electrical current is provided from an alternating current source.

15. The method of claim 1, wherein the electrical controlled propellant has particle sizes of from about 0.1 micron to about 1.0 millimeter.

16. The method of claim 1, wherein the electrical controlled propellant has particle sizes of from about 1 micron to about 200 microns.

17. The method of claim 1, wherein the electrical controlled propellant has particle sizes of from about 1 micron to about 30 microns.

18. The method of claim 1, wherein the electrically controlled propellant has a shape selected from the group consisting of: platelets, shavings, flakes, ribbons, rods, strips, spheroids, toroids, pellets, tablets, and any combination thereof.

* * * * *